(12) United States Patent
Fling

(10) Patent No.: US 6,980,123 B2
(45) Date of Patent: *Dec. 27, 2005

(54) CONTROLLING AN UNDERGROUND OBJECT

(75) Inventor: Richard William Fling, Saltford (GB)

(73) Assignee: Radiodetection Limited, Bristol (GB)

( * ) Notice: Subject to any disclaimer, the term of this patent is extended or adjusted under 35 U.S.C. 154(b) by 86 days.

This patent is subject to a terminal disclaimer.

(21) Appl. No.: 10/601,189

(22) Filed: Jun. 23, 2003

(65) Prior Publication Data

US 2004/0041713 A1 Mar. 4, 2004

Related U.S. Application Data

(63) Continuation of application No. 09/504,833, filed on Feb. 16, 2000, now Pat. No. 6,606,032.

(30) Foreign Application Priority Data

Feb. 22, 1999 (GB) ............................. 9904010

(51) Int. Cl.[7] .............................................. G01V 3/00
(52) U.S. Cl. .................... 340/853.3; 324/326; 175/45; 175/57
(58) Field of Search .................... 340/853.3, 853.8; 324/326; 175/57, 45, 38; 702/9

(56) References Cited

U.S. PATENT DOCUMENTS

| 3,908,453 | A | | 9/1975 | Jeter ............................ 73/151 |
| 4,345,650 | A | * | 8/1982 | Wesley ........................ 166/249 |
| 4,701,189 | A | | 10/1987 | Oliker ........................... 367/25 |
| 4,763,258 | A | | 8/1988 | Engelder ..................... 364/422 |
| 4,903,245 | A | * | 2/1990 | Close et al. ............... 340/853.3 |
| 4,909,336 | A | * | 3/1990 | Brown et al. .................. 175/45 |
| 5,103,919 | A | | 4/1992 | Warren et al. ................. 175/45 |
| 5,259,468 | A | * | 11/1993 | Warren et al. ................. 175/45 |
| 5,318,129 | A | | 6/1994 | Wittrisch ..................... 166/336 |
| 5,850,624 | A | * | 12/1998 | Gard et al. .................... 702/92 |
| 5,917,325 | A | | 6/1999 | Smith .......................... 324/326 |
| 6,237,404 | B1 | * | 5/2001 | Crary et al. .............. 73/152.03 |
| 6,267,185 | B1 | * | 7/2001 | Mougel et al. ................ 175/57 |
| 6,285,190 | B1 | | 9/2001 | Brune et al. ................. 324/326 |
| 2002/0105331 | A1 | | 8/2002 | Brune et al. ................. 324/326 |

FOREIGN PATENT DOCUMENTS

| EP | 0172599 | 1/1985 |
| EP | 0588390 | 6/1993 |
| GB | 2356207 | 11/1999 |
| GB | 2352743 | 7/2000 |
| WO | 96/29615 | 9/1996 |

OTHER PUBLICATIONS

Search Report of Nov. 9, 1999.
Search Report of Aug. 2, 2000.

* cited by examiner

*Primary Examiner*—Albert K. Wong
(74) *Attorney, Agent, or Firm*—Baker & Hostetler LLP

(57) ABSTRACT

In order to control the sonde of an underground object, such as an underground boring tool, a predetermined sequence of rotation steps is applied to the object and that sequence is detected. The detection of the appropriate sequence causes the sonde to change its function, for example by changing the carrier frequency of the signal transmitted by the sonde on to change the data output sequence or transfer rate, or to change output power. While it is possible to use a single rotation step, the use of more than one step, with each step to be carried out within a predetermined time, reduces the risk of error.

55 Claims, 4 Drawing Sheets

CONTROLLING AN UNDERGROUND OBJECT

This is a Request for filing a continuation or continuation-in-part application, entitled CONTROLLING AN UNDERGROUND OBJECT, under 35 U.S.C. 111(a) of pending prior application Ser. No. 09/504,833, filed on Feb. 16, 2000, now U.S. Pat. No. 6,606,032 entitled CONTROLLING AN UNDERGROUND OBJECT,

BACKGROUND OF THE INVENTION

Field of the Invention

The present invention relates to the control of an underground object. It is particularly, but not exclusively, concerned with the control of a sonde forming part of an underground boring tool.

Summary of the Prior Art

It is well known that if an underground boring tool generates a magnetic field, that magnetic field can be detected above ground by a suitable locator. An example of this is described in e.g WO96/29615 in which a solenoid on or in the underground tool generates a magnetic field which is detected to measuring locations. It is also possible, by modulating the magnetic field, to transmit information from the underground boring tool to the locator. Therefore, it is possible to have a sonde in which such field generation, modulation, etc is controlled. The sonde then makes it possible to transmit information from the underground boring tool to the locator.

In particular, it is possible for the sonde to transmit data representing the orientation of the underground boring tool. In. WO96/29615, the boring tool incorporated a tilt sensor, and the sonde could then transmit the data from that sensor to the locator. Other sensors, such as roll sensors, may also be provided.

In such arrangements, the sonde generated a low frequency electromagnetic field (typically 8 to 30 kHz), which carrier is modulated to transmit sensor data. Such communication is thus from the sonde to the locator, and there-is no direct communication from the locator to the sonde.

Normally, the carrier signal generated by the sonde is at a predetermined frequency. The locator is then controlled to detect that carrier frequency, and the modulations thereon. However, signalling between the sonde and the locator may be affected by interference from underground sources of electromagnetic radiation such as electrical cables, or the magnetic field distortion effects of buried metallic structures. Such interference effects are frequency dependent, and therefore it is possible that transmission between the sonde and the locator at a particular frequency may be greatly affected by such interference, whereas transmission at another frequency may not be affected, or affected much less. Of course, changing the carrier frequency may also affect the range of transmission between the sonde and the locator, battery life, etc, and therefore there is potentially a balance between these factors. If the operator of the locator finds that interference is a problem, the operator may decide that operating at another carrier frequency would be beneficial. However, in the existing systems, it is not possible for the operator to signal to the sonde to change frequency.

It would, of course, be possible to provide a suitable signalling path from the locator to the sonde by increasing the complexity of both the locator and the sonde. This would increase the size and cost of the sonde, which may not be desirable or practical for an underground boring tool.

However, existing underground boring tools are normally connected to their drive in a way which permits the drive to rotate the boring tool. Many underground boring tools have an axially offset slanted face which enables the boring tool to be steered so that it moves in the desired direction at any time. In order to detect this rotation, sondes associated with such tools include a roll sensor, information from which can be transmitted to the locator. In normal circumstances, the information from the roll sensor is used by the operator to control the direction of movement of the boring tool.

SUMMARY OF THE INVENTION

However, it has been realised in accordance with the present invention that if a predetermined rotation or rotation sequence is applied to the underground boring tool, a roll sensor can detect such rotation and the rotation may be treated as a command for the sonde. Thus, if the operator wants to signal to the sonde to change carrier frequency, a predetermined rotation or sequence of rotations is applied to the underground or inaccessible boring tool, detected by the roll sensor of the sonde, which sonde then determines the frequency change needed.

Although the present invention has been formulated with particular application to an underground boring tool, it is applicable to an control of an underground or inaccessible object in which a predetermined rotation or sequence of rotations is applied to that object, which rotations are treated as commands to signalling operations from the underground object.

Where there is a single rotation, the present invention may provide that a change in carrier frequency of a sonde in the underground boring tool may be triggered by a rotation which is different from that needed to trigger a change of the sonde to a state in which it does not generate electromagnetic radiation (a "park" state). Alternatively, if the sonde does not have such a park state, the change in frequency may be triggered by a single rotation.

It should be noted that the present invention is not limited to the case where the command triggers a change in carrier frequency but includes arrangements in which the command triggers other changes in functions of the sonde.

Preferably, a sequence of rotations is used to transmit a command, each rotation of which must be completed within pre-set time limits. The sequence is then chosen so that it will not occur during the normal operation of the boring tool. The use of a time limit for each rotation in the sequence of rotations significantly reduce the probability of the detection of a command during normal activities of the underground boring tool.

The present invention thus permits signalling to the sonde in an underground boring tool without modification to the boring tool or significant alteration of the features or the physical size of the sonde. In addition to altering the carrier frequency of the sonde, other features of operation, such as data output sequence, data transfer rate, or carrier output power may be controlled by signalling using the present invention.

BRIEF DESCRIPTION OF THE DRAWINGS

An embodiment of the present invention will now be described in detail, by way of example, with reference to the accompanying drawings, in which.

DETAILED DESCRIPTION

Figure 1:
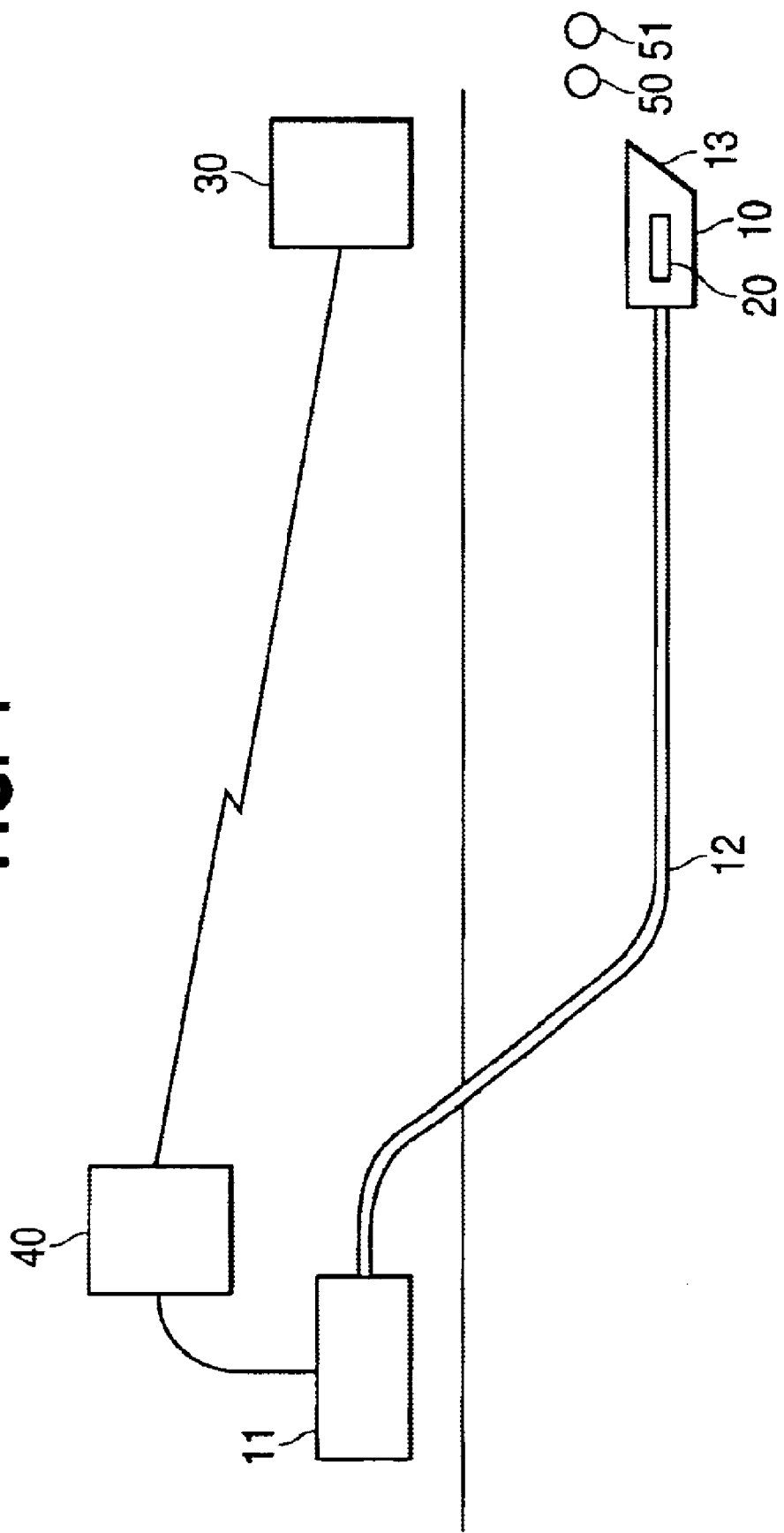
FIG. 1 is a schematic block diagram of an embodiment of the present invention.

Referring first to FIG. 1, an underground boring tool 10 is driven from a drive means 11 via a drive shaft 12. The drive means is arranged to move the boring tool 10 forward, but also to impart rotations to the boring tool 10. The boring tool 10 has a slanted leading face 13, and thus the orientation of the boring tool 10 affects the direction in which it will move.

The boring tool 10 contains a sonde 20, which incorporates a roll sensor which can detect the axial orientation of the boring tool 10. The sonde also includes means for generating a magnetic field, which generating means is controllable so that the magnetic field has a carrier frequency and a modulation means, thus the frequency may be modulated to transmit data from the sonde 20. That magnetic field is detected by a suitable locator 30. That locator 30 has means for signalling to a remote station 40, which remote station is connected to the drive means 11. It is thus possible for the operator of the locator 30 to control the movement of the underground boring tool 10 from the location of the locator, by signalling to the remote station 40, which then controls the drive means to drive the underground boring tool 10 in a suitable direction.

The sonde 20 is normally battery-driven and therefore to extend the total number of hours the sonde 20 underground, it may have a power saving mode for times in which the sonde 20 is not required to transmit data. This is known as the "park" mode. In that park mode, the sonde turns off the electromagnetic transmission, and also any other circuits of the sonde 20 which are not used. In order to initiate the park mode, the boring tool 10 is rotated through a predetermined roll angle, which can be detected by the tilt sensor of the sonde 20. When the roll sensor detects that such a rotation has occurred, and there has been no subsequent rotation for a suitable period such as 2 or 3 minutes, the sonde enters the park mode. When the sonde detects that predetermined rotation, it may trigger a display on the remote station 40 to indicate to the operator that it has received the command to change to the park mode after the predetermined delay, so that the operator can initiate another rotation if the park mode is not needed. The park mode is cancelled immediately a further rotation of the underground boring tool is detected by the sonde 20.

Figure 2:
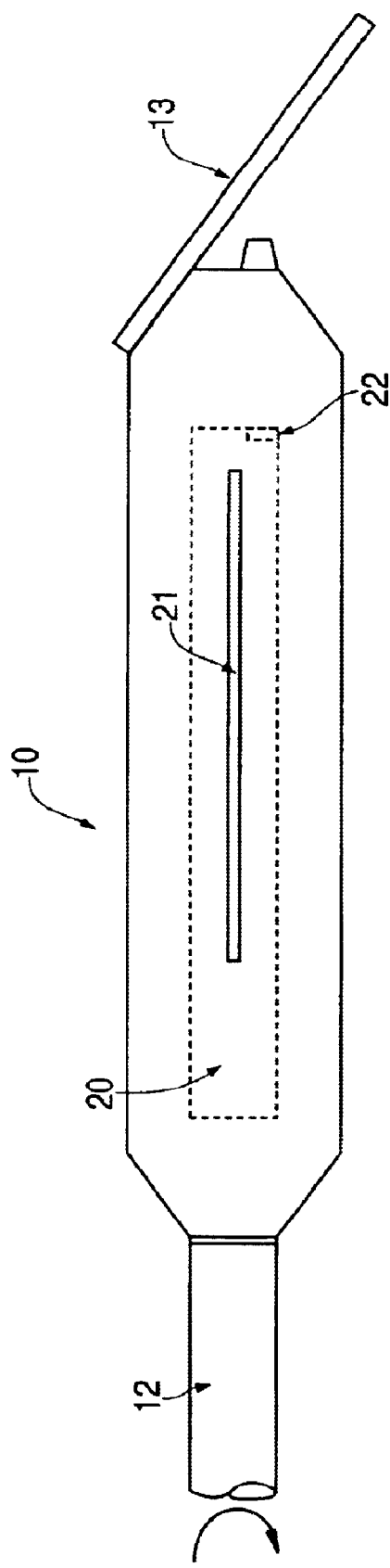
FIG. 2 shows the underground boring tool of FIG. 1 in more detail.

FIG. 2 shows the underground boring tool 10 in more detail. The slanted leading face 13 is more clearly shown, and FIG. 2 also shows that the boring tool 10 has a slot 21 therein to aid the radiation of electromagnetic signals from the sonde 20. The sonde 20 is rotationally keyed to the rest of the boring tool 10 by a key 22.

In accordance with the present invention, the underground boring tool is rotated through a predetermined angle a plurality of times. That predetermined angle may be the same as that needed to initiate the park mode, but this is not a problem provided the time interval between successive rotations is less than that needed-to trigger the park mode itself.

If there are n steps in the sequence, the number of possible commands to the sonde 20, in addition to the park command, is n−1. If the angle of successive rotations in the sequence is different from that needed to trigger the park mode, there would then be n possible commands, but it is convenient for the angles to be the same.

In such an arrangement, each rotation in the sequence must be completed within a suitable time, such as 60s otherwise the command will not be recognised. This use of a time limit for each step to be completed significantly reduces the probability of a command being identified during normal activities of the underground boring tool 10.

The ability to send commands to the sonde 20 by rotating the boring tool 10 in a suitable sequence of rotations permits an operator to change the operation of the sonde. For example, signalling between the sonde 20 and the locator 30 may be affected by conductors such as utility lines and pipes 50, 51 underground adjacent the boring tool 10. The interference generated is often frequency dependent, and therefore a change in carrier frequency may reduce the interference of the signalling. Therefore, if the operator using the locator 30 finds that there is interference, e.g because particular signals from the sonde 20 are not detected, a signal may be generated via the remote station 40 to the drive means 11 to generate a command by rotation of the underground boring tool which causes the sonde 20 to change its carrier frequency. The operator may then determine if the interference is reduced, and then the sonde 20 continues to operate at that new frequency. If there is still interference, the operator may again trigger the sonde 20 to change frequency by causing another command to be transmitted to the sonde 20 by rotation of the boring tool 10. Other commands may change data output sequence, data transfer rate, or the output power of the carrier signal.

Figure 3:
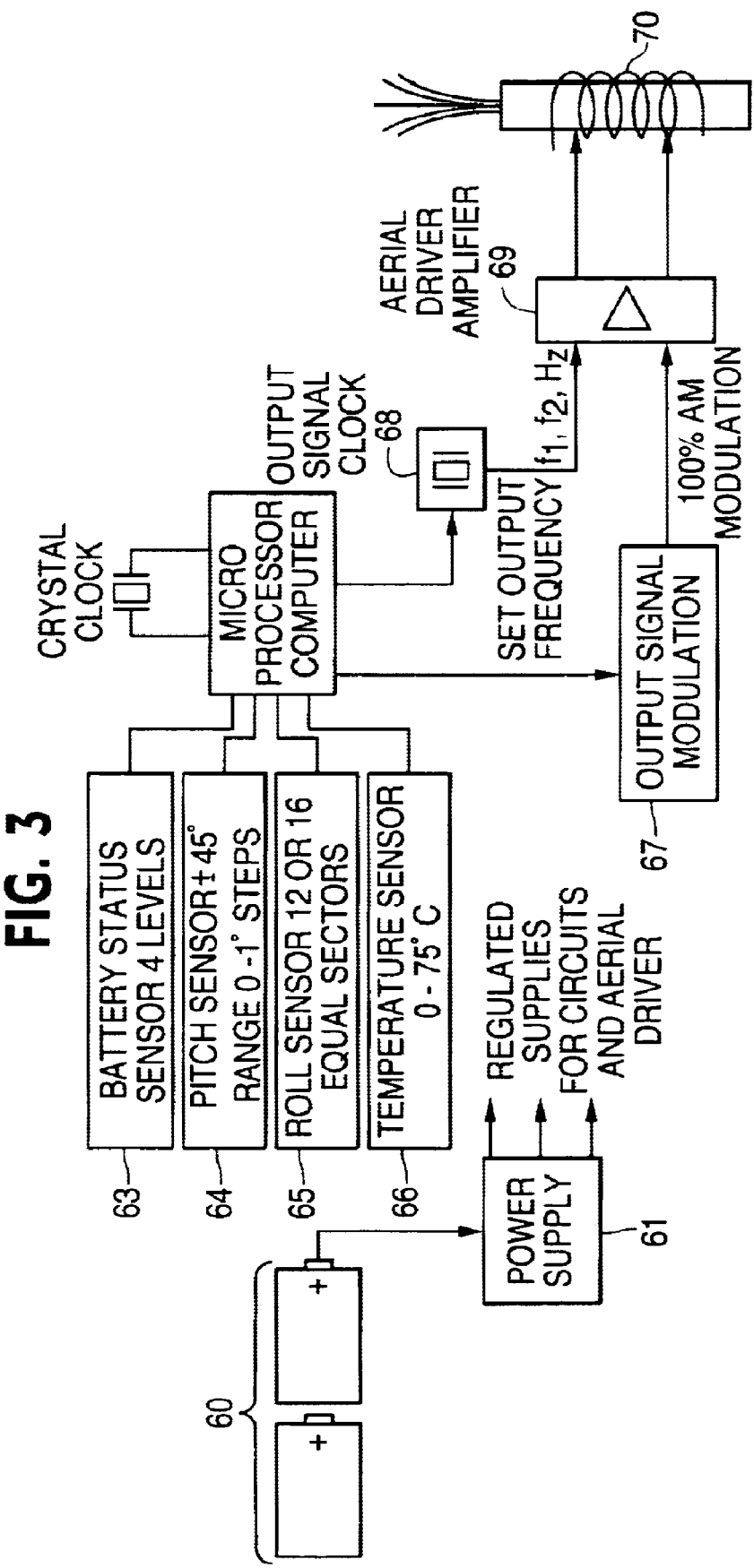
FIG. 3 is a block circuit diagram of the sonde of the boring tool of FIG. 2.

FIG. 3 shows the electrical structure of the sonde 20 in more detail. The sonde 20 is powered by a battery pack 60, which provides the input to a power supply module 61 which outputs regulated supplies for the circuits of the sonde 20. The control of the sonde 20 is by a microprocessor 62 which receives inputs from a battery sensor 63, a pitch sensor 64, a roll sensor 65 and a temperature sensor 66. The processor receives data representing the outputs of the sensor 63 to 66 and generates two outputs. One output controls a modulation unit 67 which encodes the data which the sonde 20 is to transmit, and the second output from the microprocessor 62 controls an output signal clock 68 which generates a carrier signal which is modulated by the output from the modulation unit 67 in an amplifier 69. The signal from the microprocessor 62 to the output signal clock 68 determines the frequency or frequencies which that clock outputs to the amplifier 69. The amplifier 69 then controls a solenoid 70 to generate electromagnetic signals in which the carrier signal from the output clock 68 is modulated by the output from the modulation unit 67.

In this embodiment, it is preferable for the sensors to operate step wise and thus, as shown in FIG. 3, the battery sensor has four output levels, the pitch sensor determines the pitch plus or minus 45° in steps of 0.1°, and the roll sensor determines rotations in 12 or 16 equal sectors. Thus, the roll sensor permits a sequence of rotations to be detected, in order to send commands to the sonde 20 by rotating the boring tool 10 in a suitable sequence of rotations. If such a sequence of rotations generates a command which is identified by the microprocessor 62 as one involving change of the output frequency, a suitable change is applied to the output clock 68.

Figure 4:
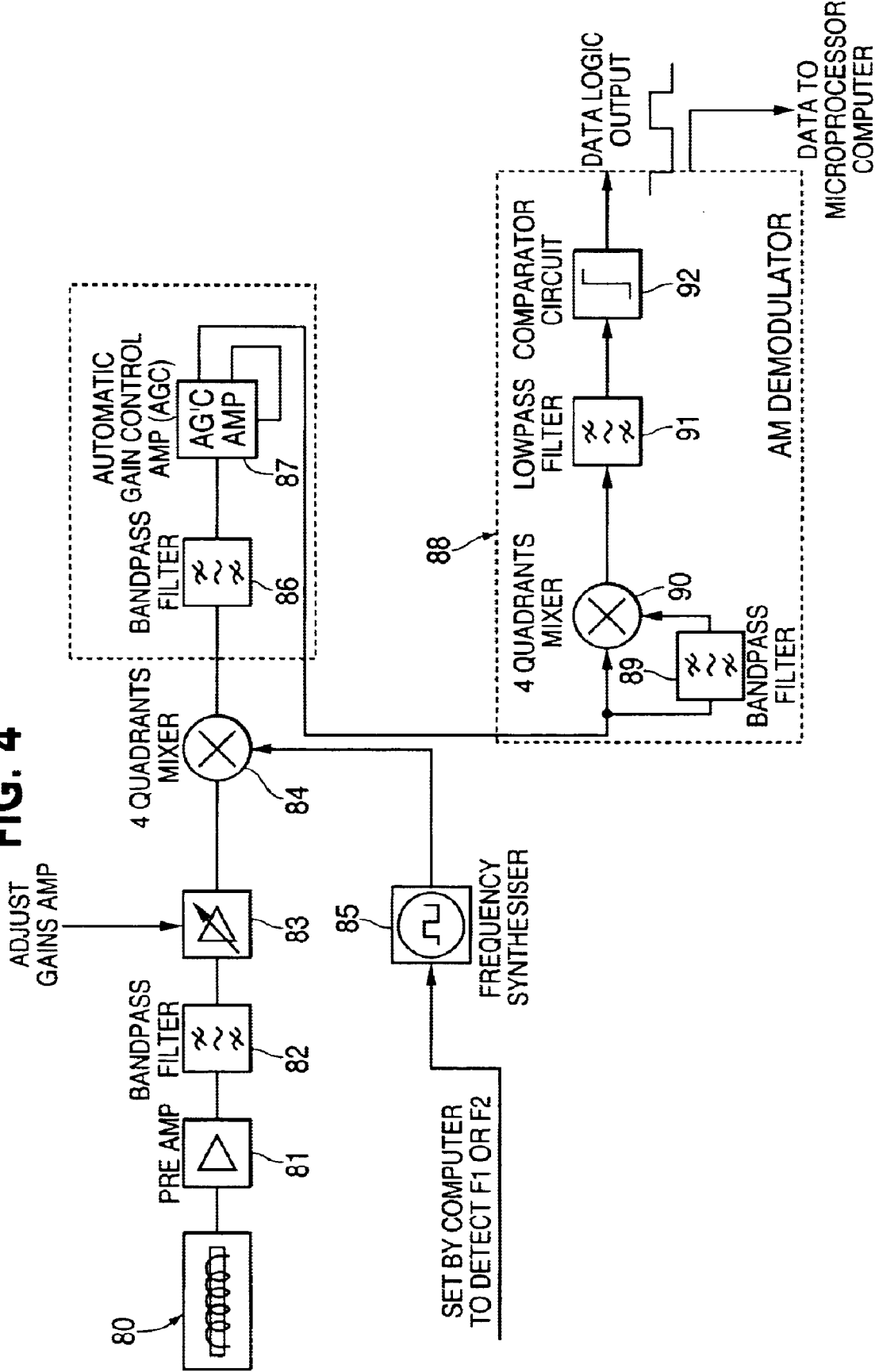
FIG. 4 is a block circuit diagram of the locator of the embodiment of FIG. 1.

FIG. 4 then shows in more detail a possible structure for the locator 30. The locator has a detection coil 80, the output of which is passed via a pre-amplifier 81, a band pass filter 82, and an adjustable gain amplifier 83 to a mixer 84. The mixer 84 also receives an input from a frequency synthesiser 85, the frequency of which is selected by a suitable input from the remote station 40 in a way which corresponds to the frequency of the carrier signal from the sonde 20. Additionally, when the sonde frequency is changed, the locator frequency synthesiser 85 is also changed under control of the operator/computer so that the data can be received at the new frequency. The output of the mixer 84 is then passed via a band pass filter 86 and an automatic gain control amplifier 87 to a demodulator 88. The demodulator 88 receives the signal from the automatic gain control amplifier 87 and passes it directly, and via a band pass filter 89, to a mixer 90, the output of which passes via a low pass filter 91 and a comparator 92, to output data representing the data applied as a modulation to the carrier signal from the sonde 20. That data output may then be passed back to the remote station 40.

What is claimed is:

1. An underground boring apparatus, comprising:
    a boring tool;
    a sonde associated with the boring tool, the sonde comprising an electromagnetic transmitter that transmits electromagnetic radiation, a sensor that senses a predetermined rotation sequence of the sonde, and a processor that changes the frequency of transmission of the electromagnetic radiation in response to sensing of the predetermined rotation sequence by the sensor; and
    a boring tool device that drives the boring tool and for applying the predetermined rotation sequence to the boring tool.

2. A boring apparatus according to claim 1, wherein the processor is programmed to change the frequency of transmission of the electromagnetic radiation in response to sensing a predetermined sequence of rotations.

3. A boring apparatus according to claim 2, wherein the sequence is chosen so that it will not occur during the normal operation of the boring tool.

4. A boring apparatus according to claim 2, wherein the processor is programmed to change the frequency of transmission of the electromagnetic radiation in response to a specific time limit of the rotation sequence.

5. An apparatus for changing a transmission frequency of a transmitting device in an underground boring tool, comprising:
    a boring tool;
    a sonde associated with the boring tool, the sonde comprising a microprocessor, a rotation sensor and a transmitter; and
    a drive device that drives the boring tool, the drive device configured to apply a predetermined rotation sequence for the boring tool.

6. The apparatus as in claim 5, wherein the rotation sensor detects the predetermined rotation sequence.

7. The apparatus as in claim 6, wherein the predetermined rotation sequence instructs the sonde to change a transmitting frequency of the transmitter.

8. The apparatus as in claim 5, wherein the rotation sequence is carried out for a specific period of time.

9. The apparatus as in claim 5, wherein the drive device further comprises a receiver.

10. The apparatus as in claim 9, wherein the receiver receives remote commands.

11. The apparatus as in claim 10, wherein the remote commands are transmitted by a remote control device.

12. The apparatus as in claim 11, wherein the remote control device detects the transmission frequency.

13. A method of changing an electromagnetic transmission frequency of a sonde associated with a boring tool used for locating the boring tool, the method comprising:
    instructing a drive device to initiate a rotation sequence of the boring tool;
    rotating the boring tool in the rotation sequence; and
    changing the transmission frequency of the sonde based upon occurrence of the rotation sequence.

14. The method according to claim 13, wherein the rotation sequence comprises a predetermined sequence of rotations.

15. The method according to claim 14, wherein the rotation sequence is chosen so that it will not occur during the normal operation of the boring tool.

16. The method according to claim 14, wherein each rotation is carried out within a time limit.

17. A method according to claim 15, wherein each rotation is carried out within a time limit.

18. A system for changing an electromagnetic transmission frequency of a sonde associated with a boring tool used for locating the boring tool, the system comprising:
    means for instructing a drive device to initiate a rotation sequence of the boring tool;
    means for rotating the boring tool in the rotation sequence; and
    means for changing the transmission frequency of the sonde based upon occurrence of the rotation sequence.

19. The system according to claim 18, wherein the rotation sequence comprises a predetermined sequence of rotations.

20. The system according to claim 19, wherein the rotation sequence is chosen so that it will not occur during the normal operation of the boring tool.

21. The system according to claim 19, wherein each rotation is carried out within a time limit.

22. The system according to claim 20, wherein each rotation is carried out within a time limit.

23. A sonde associated on a boring tool, comprising:
    an electromagnetic transmitter that transmits electromagnetic radiation;
    a sensor that senses a rotation sequence of the sonde; and
    a processor that controls the electromagnetic transmitter in response to sensing of the rotation sequence by the sensor.

24. The sonde according to claim 23, wherein the processor is programmed to change the frequency of transmission of the electromagnetic radiation in response to the sequence of rotations.

25. The sonde according to claim 24, wherein the sequence is chosen so that it will not occur during the normal operation of the boring tool.

26. The sonde according to claim 24, the processor is programmed to change the frequency of transmission of the electromagnetic radiation in response to each rotation carried out for a time limit.

27. The sonde according to claim 25, wherein the processor is programmed to change the frequency of transmission of the electromagnetic radiation in response to each rotation carried out within a time limit.

28. A sonde associated with a boring tool for location of the boring tool underground, the sonde comprising:
    means for transmitting electromagnetic radiation to a remote device at a frequency;
    means for sensing a rotation sequence of the sonde; and
    means for changing the frequency of the means for transmitting in response to the means for sensing when the rotation sequence of the boring tool is sensed.

29. The sonde according to claim 28, wherein the means for changing is adapted to change the frequency of transmission of the electromagnetic radiation in response to the sequence of rotations.

30. The sonde according to claim 29, wherein the rotation sequence is chosen so that it will not occur during the normal operation of the boring tool.

31. The sonde according to claim 29, wherein the means for changing is adapted to change the frequency of transmission of the electromagnetic radiation in response to the rotation sequence carried out for a specific time limit.

32. A method for using a sonde associated with a boring tool for location of the boring tool underground, the sonde comprising:

transmitting electromagnetic radiation to a remote device at a frequency;

sensing a rotation sequence of the sonde; and changing the frequency of the transmitting in response to the means for sensing detecting the rotation sequence of the boring tool.

33. The sonde according to claim 32, wherein the means for changing is adapted to change the frequency of transmission of the electromagnetic radiation in response to the rotation sequence.

34. The sonde according to claim 33, wherein the sequence is chosen so that it will not occur during the normal operation of the boring tool.

35. The sonde according to claim 33, wherein the means for changing is adapted to change the frequency of transmission of the electromagnetic radiation in response to the rotation sequence carried out for a specific time limit.

36. A locator apparatus for locating an underground boring tool, comprising:

a sonde attached to the boring tool, the sonde comprising an electromagnetic transmitter that transmits electromagnetic radiation at a frequency, a sensor that senses predetermined rotation of the sonde, and a processor that changes the frequency of transmission of the electromagnetic radiation in response to sensing of the predetermined rotation by the sensor; and a locator that receives the electromagnetic radiation transmitted by the sonde to identify the location of the boring tool.

37. The locator apparatus according to claim 36, wherein the processor is programmed to change the frequency of transmission of the electromagnetic radiation in response to a predetermined sequence of rotations.

38. The locator apparatus according to claim 37, wherein the sequence is chosen so that it will not occur during the normal operation of the boring tool.

39. The locator apparatus according to claim 38, wherein the processor is programmed to change the frequency of transmission of the electromagnetic radiation in response to the rotation sequence carried out for a specific time limit.

40. A system for locating an underground boring tool, comprising:

means for determining the location of the boring tools comprising means for transmitting electromagnetic radiation at a frequency, means for sensing a predetermined rotation of the sonde, and means for changing the frequency of transmission of the electromagnetic radiation in response to the means for sensing the predetermined rotation by the sensor; and means for locating the boring comprising means for receiving the electromagnetic radiation transmitted by the means for determining to identify the location of the boring tool.

41. The system apparatus according to claim 40, wherein the means for changing is programmed to change the frequency of transmission of the electromagnetic radiation in response to sensing of a predetermined sequence of rotations.

42. The system according to claim 41, wherein the sequence is chosen so that it will not occur during the normal operation of the boring tool.

43. The system according to claim 42, wherein the means for changing is programmed to change the frequency of transmission of the electromagnetic radiation in response to each rotation carried out for a time limit.

44. A method for locating an underground boring tool, comprising:

determining the location of the boring tool with a sonde that comprises a transmitter that transmits electromagnetic radiation at a frequency, a sensor that senses a predetermined rotation of the sonde, and a processor that changes the frequency of transmission of the electromagnetic radiation in response to the sensor sensing the predetermined rotation by the sensor; and locating the boring tools with a locator that comprises a receiver that receives the electromagnetic radiation transmitted by the sonde to identify the location of the boring tool.

45. The method according to claim 44, wherein the processor is programmed to change the frequency of transmission of the electromagnetic radiation in response to a predetermined sequence of rotations.

46. The method according to claim 45, wherein the sequence is chosen so that it will not occur during the normal operation of the boring tool.

47. The method according to claim 46, wherein the to the means for changing is programmed to change the frequency of transmission of the electromagnetic radiation in response to each rotation carried out for a time limit.

48. A method of determining information related to a state of an underground boring tool using a sonde associated with the boring tool, the method comprising:

transmitting electromagnetic radiation at a transmission frequency from the sonde;

sensing a rotation of the sonde; and changing the transmission frequency upon detection of the rotation.

49. The method according to claim 48, wherein comprising detecting the transmitted electromagnetic radiation at a surface above the boring tool.

50. The method according to claim 49, further comprising determining the information related to the state of the boring tool using the detected electromagnetic radiation.

51. A method according to claim 49, wherein the rotation comprises a predetermined sequence of rotations.

52. A method according to claim 51, wherein the sequence of rotating is chosen so that it will not occur during the normal operation of the boring tool.

53. A method according to claim 52, wherein each rotation is carried out for a specific time limit.

54. A method for changing the transmission frequency of a sonde below a ground surface, comprising:

initiating a predetermined rotation of a boring tool;

detecting the predetermined rotation of the boring tool by the sonde; and changing the transmission frequency of the sonde in response to the predetermined rotation.

55. A system for changing the transmission frequency of a sonde below a ground surface, comprising:

means for initiating a predetermined rotation of a boring tool;

means for detecting the predetermined rotation of the boring tool by the sonde;

means for changing the transmission frequency of the sonde in response to the predetermined rotation.

* * * * *

UNITED STATES PATENT AND TRADEMARK OFFICE
CERTIFICATE OF CORRECTION

PATENT NO. : 6,980,123 B2  Page 1 of 1
APPLICATION NO. : 10/601189
DATED : December 27, 2005
INVENTOR(S) : Richard W. Fling It is certified that error appears in the above-identified patent and that said Letters Patent is hereby corrected as shown below:

Title page,
Item [56], References Cited, U.S. PATENT DOCUMENTS, delete
"4,701,189 A    10/1987    Oliker    367/25" and insert
-- 4,701,890 A    10/1987    Ohmer et al.    367/25 --.

Column 8,
Line 1, delete "to the".
Line 1, delete "wherein" and insert -- further --.

Signed and Sealed this

Twenty-seventh Day of June, 2006

JON W. DUDAS
*Director of the United States Patent and Trademark Office*